United States Patent
Palkar et al.

(10) Patent No.: US 11,586,892 B1
(45) Date of Patent: Feb. 21, 2023

(54) MODELING QUANTIZATION LOSS USING A PREPROCESSING NETWORK THAT SIMULATES HARDWARE BEHAVIOR

(71) Applicant: Ambarella International LP, Santa Clara, CA (US)

(72) Inventors: Malhar Palkar, Cupertino, CA (US); Santosh Chilkunda, Santa Clara, CA (US); Sabhatina Palani Selvam, Madison, WI (US)

(73) Assignee: Ambarella International LP, Santa Clara, CA (US)

( * ) Notice: Subject to any disclaimer, the term of this patent is extended or adjusted under 35 U.S.C. 154(b) by 559 days.

(21) Appl. No.: 16/788,988

(22) Filed: Feb. 12, 2020

(51) Int. Cl.
  *G06N 3/063*  (2006.01)
  *G06F 16/901*  (2019.01)
  *H04N 5/232*  (2006.01)
  *G06N 3/04*  (2023.01)

(52) U.S. Cl.
  CPC ......... *G06N 3/063* (2013.01); *G06F 16/9024* (2019.01); *G06N 3/0454* (2013.01); *H04N 5/23206* (2013.01)

(58) Field of Classification Search
  CPC .. G06N 3/063; G06N 3/0454; G06F 16/9024; H04N 5/23206
  See application file for complete search history.

(56) References Cited

U.S. PATENT DOCUMENTS

| | | | |
|---|---|---|---|
| 2019/0325314 A1* | 10/2019 | Bourges-Sevenier | G06N 3/063 |
| 2020/0302295 A1* | 9/2020 | Tung | G06N 3/02 |
| 2021/0133650 A1* | 5/2021 | Cella | G06Q 30/0635 |

OTHER PUBLICATIONS

Oktay, Ozan, et cl., "Attention U-Net: Learning Where to Look for the Pancreas", 1st Conference on Medical Imaging with Deep Learning (MIDL 2018), Amsterdam, The Netherlands, arXiv: 1804.03999v3 [cs.CV] May 20, 2018, 10 pages.

Vandenhende, Simon, et al., A Three-Player GAN: Generating Hard Samples To Improve Classification Networks, arXiv: 1903.03496v1 [ cs.CV] Mar. 8, 2019, 6 pages.

* cited by examiner

*Primary Examiner* — Kristie D Shingles
(74) *Attorney, Agent, or Firm* — Christopher P. Maiorana, PC

(57) ABSTRACT

An apparatus includes a preprocessing network and a quantized neural network. The preprocessing network may be configured to (a) receive an input, (b) perform a transform operation on the input, and (c) generate an intermediate result in response to the transform operation. The quantized neural network may be configured to (a) receive the intermediate result, (b) perform a plurality of weighted operations on the intermediate result, and (c) generate an output in response to the weighted operations. The quantized neural network is generally adapted to a hardware constraint of an edge device. The weighted operations generally have a quantization loss corresponding to the hardware constraint. The transform operation performed by the preprocessing network is generally configured to provide compensation for the quantization loss.

20 Claims, 8 Drawing Sheets

US 11,586,892 B1

MODELING QUANTIZATION LOSS USING A PREPROCESSING NETWORK THAT SIMULATES HARDWARE BEHAVIOR

FIELD OF THE INVENTION

The invention relates to neural networks generally and, more particularly, to a method and/or apparatus for modeling quantization loss using a preprocessing network that simulates hardware behavior.

BACKGROUND

A neural network, more properly referred to as an "artificial" neural network (ANN), is a computing system made up of a number of simple, highly interconnected processing elements, which process information by respective dynamic state responses to external inputs. Neural networks are processing devices (algorithms or actual hardware) that are loosely modeled after the neuronal structure of a brain, but on much smaller scales. A large neural network can have hundreds or thousands of processing units.

Neural networks are typically organized in layers. The layers can comprise a number of interconnected nodes that perform an operation or activation function. Input data is presented to an input layer of the network, which communicates to one or more internal (or hidden) layers where the actual processing is performed via an arrangement of weighted connections. The process of determining the weights for the weighted connections of the neural network is typically referred to as training. The hidden layers connect to an output layer where the result of a prediction model implemented by the neural network is presented. Application of neural networks can require large amounts of memory and computations.

Neural networks typically are trained in floating point (FP(32)) precision. Edge devices typically work at lower precision to save on bandwidth and computation cost. Lower precision can be represented in both floating point and fixed point formats. Fixed point format is the preferred format for most edge devices as fixed point formats offer more computational savings. Converting floating point data to fixed point data, generally referred to as quantization, is a lossy process. When a neural network is ported to an edge device, the inference accuracy of the neural network may be lower than the original floating point format model due to quantization.

On most hardware architectures, the fixed point data format of each layer in the neural network can be set individually. This flexibility allows determining the data format of each layer by running inference on a representative dataset. Statistics like min, max, and variance are recorded, and the statistics are used to pick the data format of each layer. This process is called post training quantization. Post training quantization tries to minimize the reduction in accuracy due to quantization. However, the accuracy of the network generated utilizing post training quantization might still be lower than the original accuracy as no new information is added to the neural network. The amount of quantization loss depends on the complexity of the neural network and the size of the representative dataset. From a perspective of an end user, the effort required in porting the neural network to the edge device is minimal with post training quantization.

Another technique to minimize the reduction in accuracy due to quantization is called quantization aware training. Quantization aware training ensures that the forward pass matches precision for both training and inference. Quantization aware training models the effect of quantization loss into the neural network and can result in a better accuracy on edge devices. However, because each hardware architecture is different, the end user might have to train the network multiple times to get good results on different architectures. Thus, the quality of the neural network on an edge device is dependent on the effort involved. Post training quantization is straight-forward but can lead to sub-optimal results. Quantization aware training can yield good results but the training might have to be done differently for each architecture.

It would be desirable to implement a method and/or apparatus for modeling quantization loss using a preprocessing network that simulates hardware behavior.

SUMMARY

The invention concerns an apparatus comprising a preprocessing network and a quantized neural network. The preprocessing network may be configured to (a) receive an input, (b) perform a transform operation on the input, and (c) generate an intermediate result in response to the transform operation. The quantized neural network may be configured to (a) receive the intermediate result, (b) perform a plurality of weighted operations on the intermediate result, and (c) generate an output in response to the weighted operations. The quantized neural network is generally adapted to a hardware constraint of an edge device. The weighted operations generally have a quantization loss corresponding to the hardware constraint. The transform operation performed by the preprocessing network is generally configured to provide compensation for the quantization loss.

BRIEF DESCRIPTION OF THE FIGURES

Embodiments of the invention will be apparent from the following detailed description and the appended claims and drawings.

DETAILED DESCRIPTION OF THE EMBODIMENTS

Embodiments of the present invention include providing for modeling quantization loss using a preprocessing network that may (i) simulate hardware behavior, (ii) involve training a low complexity preprocessing network on a dataset of a user, (iii) provide a preprocessing network trained to adapt to quantization loss of an edge device, (iv) involve less effort compared to training a whole network, (v) provide better quality than post training quantization, (vi) be trained to minimize one or more of discriminator loss, prediction loss, and feature loss, (vii) generate a preprocessing network that may be applied to an input prior to applying a quantized neural network to lower quantization errors, and/or (viii) be implemented as one or more integrated circuits.

Figure 1:
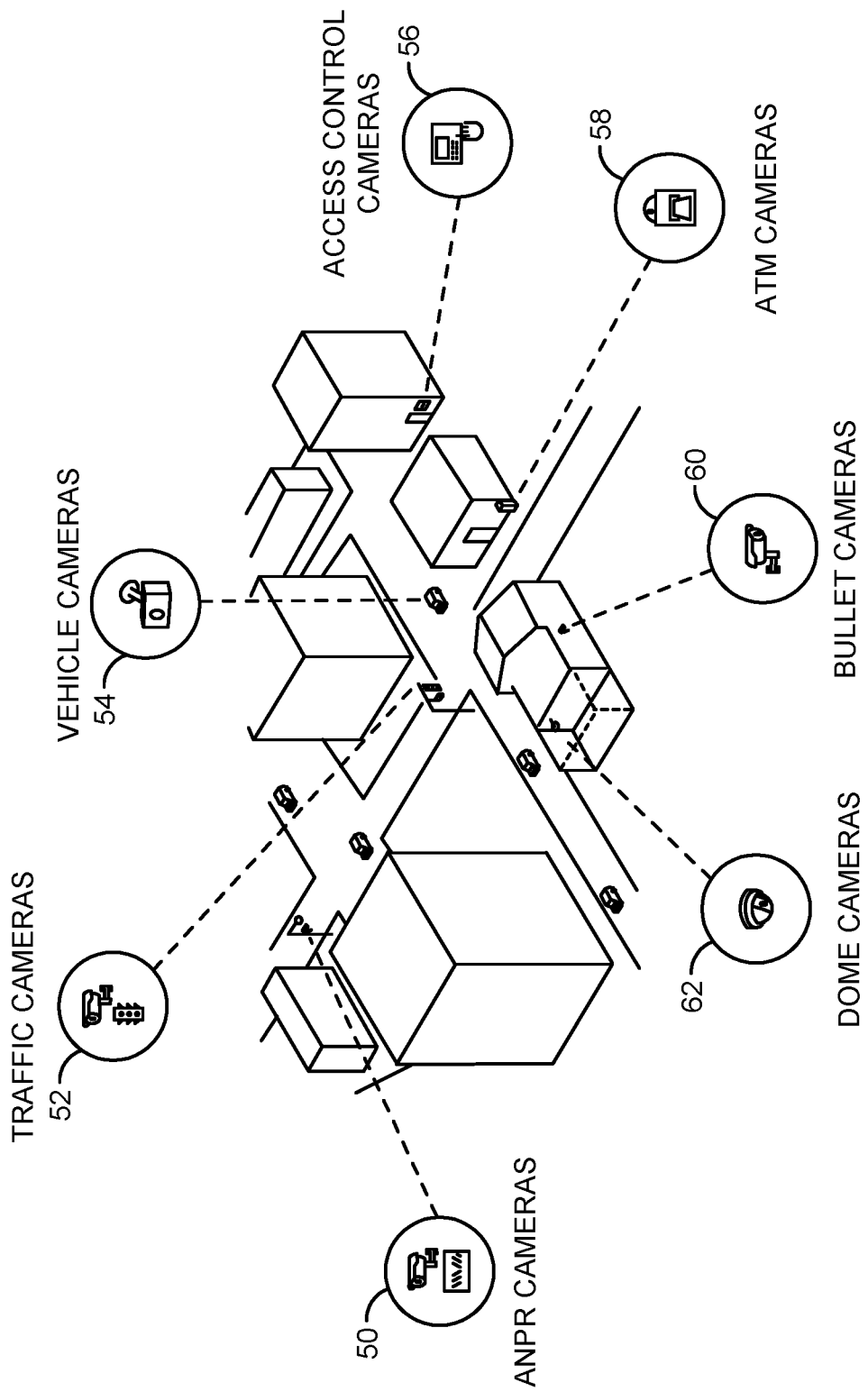
FIG. 1 is a diagram illustrating examples of edge devices that may utilize a preprocessing network generated in accordance with example embodiments of the invention.

Referring to FIG. 1, a diagram is shown illustrating examples of edge devices that may utilize a preprocessing network generated in accordance with example embodiments of the invention. In an example, edge devices may include low power technology designed to be deployed in embedded platforms at the edge (e.g., battery-powered devices), where power consumption is a critical concern. In an example, edge devices may comprise traffic cameras and intelligent transportation systems (ITS) solutions including automated number plate recognition (ANPR) cameras 50, traffic cameras 52, vehicle cameras 54, access control cameras 56, automatic teller machine (ATM) cameras 58, bullet cameras 60, and dome cameras 62. In an example, the traffic cameras and intelligent transportation systems (ITS) solutions may be designed to enhance roadway security with a combination of person and vehicle detection, vehicle make/model recognition, and automatic number plate recognition (ANPR) capabilities. In an example, person and vehicle detection, vehicle make/model recognition, and automatic number plate recognition (ANPR) capabilities may be facilitated utilizing preprocessing network and quantized neural network technology in accordance with embodiments of the invention.

Figure 2:
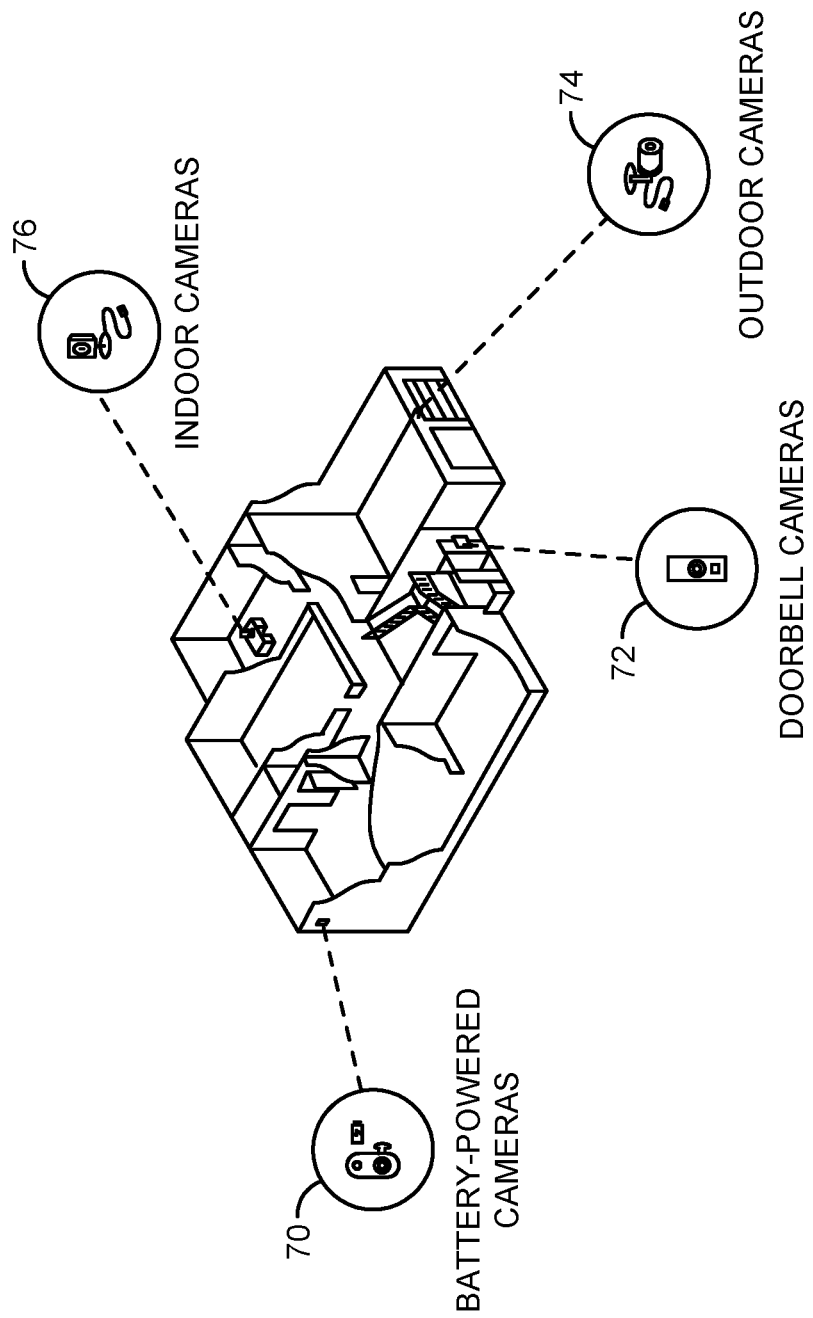
FIG. 2 is a diagram illustrating additional examples of edge devices that may utilize a preprocessing network generated in accordance with example embodiments of the invention.

Referring to FIG. 2, a diagram is shown illustrating additional examples of edge devices that may utilize a preprocessing network generated in accordance with example embodiments of the invention. In an example, edge devices may comprise security camera applications. In an example, the security camera applications may include battery-powered cameras 70, doorbell cameras 72, outdoor cameras 74, and indoor cameras 76. In an example, the security camera application edge devices may include low power technology designed to be deployed in embedded platforms at the edge (e.g., battery-powered devices), where power consumption is a critical concern. The security camera applications may realize performance benefits from application of preprocessing network and quantized neural network technology in accordance with embodiments of the invention.

In various embodiments, a low complexity preprocessing network may be generated. The low complexity preprocessing network is generally trained using a dataset provided by an end user. The preprocessing network is generally trained to adapt to a quantization loss of an edge device on which the preprocessing network will be utilized in conjunction with a quantized neural network. Training the preprocessing network generally involves less effort than training the quantized neural network. The inference quality provided by the combination of the preprocessing network and the quantized neural network may be better than an inference quality provided by post training quantization, but with less effort than to obtain an inference quality provided by quantization aware training.

Figure 3:
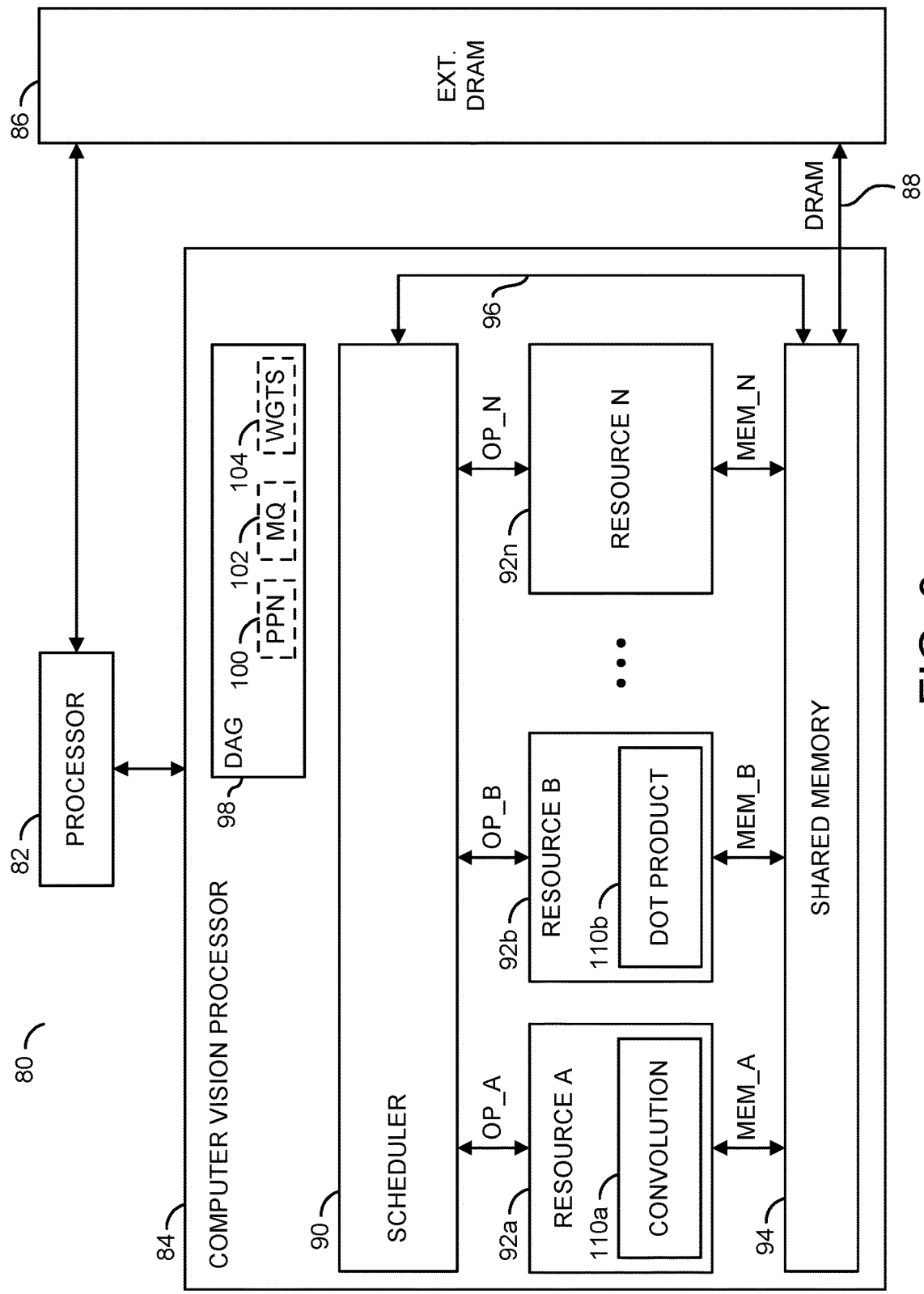
FIG. 3 is a diagram illustrating a system in which a preprocessing network and a quantized neural network may be utilized.

Referring to FIG. 3, a diagram is shown illustrating a system 80 in which a preprocessing network and a quantized neural network may be utilized. The system (or apparatus) 80 may be implemented as part of a computer vision system. In various embodiments, the system 80 may be implemented in an edge device. In an example, the system 80 may be implemented as part of a camera, a computer, a server (e.g., a cloud server), a smart phone (e.g., a cellular telephone), a personal digital assistant, etc. The system 80 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the system 80 generally comprises hardware circuitry that is optimized to provide a high performance image processing and computer vision pipeline in minimal area and with minimal power consumption. In an example, various operations used to perform image processing, feature detection/extraction, and/or object detection for computer (or machine) vision may be implemented using hardware modules designed to reduce computational complexity and use resources efficiently.

In an example embodiment, the system 80 generally comprises a block (or circuit) 82, a block (or circuit) 84, a block (or circuit) 86, and/or a memory bus 88. The circuit 82 may implement a first processor. The circuit 84 may implement a second processor. The circuit 86 may implement an external memory (e.g., a memory external to the circuits 82 and 84). In an example, the circuit 84 may implement a computer vision processor. In an example, the processor 84 may be an intelligent vision processor. The system 80 may comprise other components (not shown). The number, type and/or arrangement of the components of the system 80 may be varied according to the design criteria of a particular implementation.

The circuit 82 may implement a processor circuit. In some embodiments, the processor circuit 82 may be a general purpose processor circuit. The processor circuit 82 may be operational to interact with the circuit 84 and the circuit 86 to perform various processing tasks. In an example, the processor 82 may be configured as a controller for the circuit 84. The processor 82 may be configured to execute computer readable instructions. In one example, the computer readable instructions may be stored by the circuit 86. In some embodiments, the computer readable instructions may comprise controller operations. The processor 82 may be configured to communicate with the circuit 84 and/or access results generated by components of the circuit 84. In an example, the processor 82 may be configured to utilize the circuit 84 to perform operations associated with a preprocessing network and/or a neural network model. In another example, the processor 82 may be configured to program the circuit 84 with a preprocessing network (PPN) 100 in accordance with an example embodiment of the invention, a neural network 102, and weights (WGTS) 104. In an example, the neural network 102 may be a quantized neural network (MQ) configured for operation in an edge device. The PPN 100 may be configured (e.g., trained) to compensate the MQ 102 for a quantization loss related to the system 80. The operations performed by the processor 82 may be varied according to the design criteria of a particular implementation.

In various embodiments, the circuit 86 may implement a dynamic random access memory (DRAM) circuit. The DRAM circuit 86 is generally operational to store multidimensional arrays of input data elements and various forms of output data elements. The DRAM circuit 86 may exchange the input data elements and the output data elements between the processor circuit 82 and the processor circuit 84.

The circuit 84 may implement a processor circuit. In an example, the circuit 84 may be configured to implement various functionality used for computer vision. The processor circuit 84 is generally operational to perform specific processing tasks as arranged by the processor circuit 82. In various embodiments, the processor 84 may be implemented solely in hardware. The processor 84 may directly execute a data flow directed to object detection, and generated by software that specifies processing (e.g., computer vision) tasks. In some embodiments, the circuit 84 may be a representative example of numerous computer vision processors implemented by the system 80 and configured to operate together.

The circuit 84 generally comprises a block (or circuit) 90, one or more blocks (or circuits) 92a-92n, a block (or circuit) 94, a path 96, and a block (or circuit) 98. The block 90 may implement a scheduler circuit. The blocks 92a-92n may implement hardware resources (or engines). The block 94 may implement a shared memory circuit. The block 98 may implement a directed acyclic graph (DAG) memory. In an example embodiment, one or more of the circuits 92a-92n may comprise blocks (or circuits) 110a-110n. In the example shown, a block 110a and a block 110b are implemented. In an example, the circuit 110a may implement convolution operations. In another example, the circuit 110b may be configured to provide dot product operations. The convolution and dot product operation may be used to perform computer (or machine) vision tasks (e.g., as part of an object detection process). In yet another example, one or more of the circuits 92c-92n may comprise blocks (or circuits) 110c-110n (not shown) to provide convolution calculations in multiple dimensions. An example implementation of a convolution calculation scheme that may be used by one or more of the circuits 92a-92n may be found in co-pending U.S. application Ser. No. 15/403,540, filed Jan. 11, 2017, which is herein incorporated by reference in its entirety. The circuit 84 may be configured to receive directed acyclic graphs (DAGs) from the processor 82. The DAGs received from the processor 82 may be stored in the DAG memory 98. The circuit 84 may be configured to execute DAGs for the PPN 100 and the MQ 102 using the circuits 90, 92a-92n, and 94.

Multiple signals (e.g., OP_A to OP_N) may be exchanged between the circuit 90 and the respective circuits 92a-92n. Each signal OP_A to OP_N may convey execution operation information and/or yield operation information. Multiple signals (e.g., MEM_A to MEM_N) may be exchanged between the respective circuits 92a-92n and the circuit 94. The signals MEM_A to MEM_N may carry data. A signal (e.g., DRAM) may be exchanged between the circuit 86 and the circuit 94. The signal DRAM may transfer data between the circuits 86 and 94 (e.g., on the memory bus 88).

The circuit 90 may implement a scheduler circuit. The scheduler circuit 90 is generally operational to schedule tasks among the circuits 92a-92n to perform a variety of computer vision related tasks as defined by the processor circuit 82. Individual tasks may be allocated by the scheduler circuit 90 to the circuits 92a-92n. The scheduler circuit 90 may allocate the individual tasks in response to parsing the directed acyclic graphs provided by the processor 82. The scheduler circuit 90 may time multiplex the tasks to the circuits 92a-92n based on the availability of the circuits 92a-92n to perform the work.

Each circuit 92a-92n may implement a processing resource (or hardware engine). The hardware engines 92a-92n are generally operational to perform specific processing tasks. The hardware engines 92a-92n may be implemented to include dedicated hardware circuits that are optimized for high-performance and low power consumption while performing the specific processing tasks. In some configurations, the hardware engines 92a-92n may operate in parallel and independent of each other. In other configurations, the hardware engines 92a-92n may operate collectively among each other to perform allocated tasks.

The hardware engines 92a-92n may be homogenous processing resources (e.g., all circuits 92a-92n may have the same capabilities) or heterogeneous processing resources (e.g., two or more circuits 92a-92n may have different capabilities). The hardware engines 92a-92n are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator, etc.

In various embodiments, the hardware engines 92a-92n may be implemented solely as hardware circuits. In some embodiments, the hardware engines 92a-92n may be implemented as generic engines that may be configured through circuit customization and/or software/firmware to operate as special purpose machines (or engines). In some embodiments, the hardware engines 92a-92n may instead be implemented as one or more instances or threads of program code executed on the processor 82 and/or one or more processors 84, including, but not limited to, a vector processor, a central processing unit (CPU), a digital signal processor (DSP), or a graphics processing unit (GPU). In some embodiments, one or more of the hardware engines 92a-92n may be selected for a particular process and/or thread by the scheduler 90. The scheduler 90 may be configured to assign the hardware engines 92a-92n to particular tasks in response to parsing the directed acyclic graphs stored in the DAG memory 98.

The circuit 94 may implement a shared memory circuit. The shared memory 94 may be configured to store data in response to input requests and/or present data in response to output requests (e.g., requests from the processor 82, the DRAM 86, the scheduler circuit 90 and/or the hardware engines 92a-92n). In an example, the shared memory circuit 94 may implement an on-chip memory for the computer vision processor 84. The shared memory 94 is generally operational to store all of or portions of the multidimensional arrays (or vectors) of input data elements and output data elements generated and/or utilized by the hardware engines 92a-92n. The input data elements may be transferred to the shared memory 94 from the DRAM circuit 86 via the memory bus 88. The output data elements may be sent from the shared memory 94 to the DRAM circuit 86 via the memory bus 88.

The path 96 may implement a transfer path internal to the processor 84. The transfer path 96 is generally operational to move data from the scheduler circuit 90 to the shared memory 94. The transfer path 96 may also be operational to move data from the shared memory 94 to the scheduler circuit 90.

The processor 82 is shown communicating with the computer vision processor 84. The processor 82 may be configured as a controller for the computer vision processor 84. In some embodiments, the processor 82 may be configured to transfer instructions to the scheduler 90. For example, the processor 82 may provide one or more directed acyclic graphs to the scheduler 90 via the DAG memory 98. The scheduler 90 may initialize and/or configure the hardware engines 92a-92n in response to parsing the directed acyclic graphs. In some embodiments, the processor 82 may receive status information from the scheduler 90. For example, the scheduler 90 may provide a status information and/or readiness of outputs from the hardware engines 92a-92n to the processor 82 to enable the processor 82 to determine one or more next instructions to execute and/or decisions to make. In some embodiments, the processor 82 may be configured to communicate with the shared memory 94 (e.g., directly or through the scheduler 90, which receives data from the shared memory 94 via the path 96). The processor 82 may be configured to retrieve information from the shared memory 94 to make decisions. The instructions performed by the processor 82 in response to information from the computer vision processor 84 may be varied according to the design criteria of a particular implementation.

Figure 4:
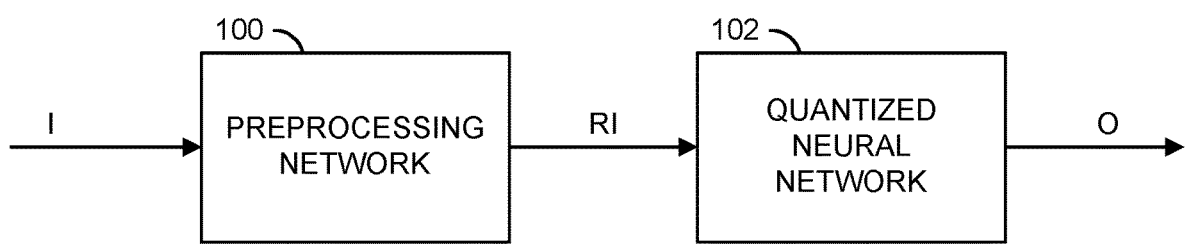
FIG. 4 is a diagram illustrating an example data flow utilizing a preprocessing network and a quantized neural network in accordance with example embodiments of the invention.

Referring to FIG. 4, a diagram is shown illustrating an example data flow utilizing a preprocessing network 100 and a quantized neural network 102 in accordance with example embodiments of the invention. In an example, input data (e.g., an inference image I) may be presented to an input of the preprocessing network 100. In response to the input data, the preprocessing network 100 may present intermediate data (e.g., a representative image RI) to an input of the quantized neural network 102. In response to the intermediate data, the quantized neural network 102 may generate output data O (e.g., inference(s) about the image I). The quantized neural network 102 generally provides a function approximator. The preprocessing network 100 may be applied prior to the quantized neural network 102 to lower quantization errors on edge devices. During inference, the input I is passed through the preprocessing network 100 before going through the quantized neural network 102.

Operation of the preprocessing network 100 may be illustrated by the following example. In an example, a neural network may be configured to perform a non-linear function $Y=2*X^2+3$ on input data. An example operation of the neural network implementing the non-linear function $Y=2*X^2+3$ may be summarized in the following TABLE 1:

TABLE 1

| X | 3.15 | 3.50 | 3.80 |
|---|------|------|------|
| Y | 22.85 | 27.5 | 31.88 |

In an example, the neural network implementing the non-linear function $Y=2*X^2+3$ may need to be run on an edge device requiring quantization of the neural network. In an example, the neural network may be run on an edge device that applies a ceiling function (e.g., $Xq=ceil(X)$) to do the quantization. In an example, operation of the quantized neural network running on the edge device may be represented as a quantization block generating an intermediate value by applying the ceiling function to the input X prior to the input being applied to neural network. An output of the quantization block (e.g., Xq) is then presented as the input to the neural network. An example operation of the quantized neural network running on the edge device implementing the non-linear function $Yq=2*Xq^2+3$ may be summarized in the following TABLE 2:

TABLE 2

| X | 3.15 | 3.50 | 3.80 |
|---|------|------|------|
| Xq | 4 | 4 | 4 |
| Yq | 35 | 35 | 35 |
| Q Err | 12.15 | 7.5 | 3.12 |

The absolute difference between Yq and Y is the quantization error (Q Err in TABLE 2 above).

In an example, the preprocessing network 100 may be configured to apply another function (e.g., H) before computing Xq. In an example, the preprocessing network 100 may perform a function $H(X)=ceil(X-0.5)/ceil(X)$. An output of the preprocessing network 100 (e.g., $X'=X*H(X)$) may then be presented as the input to the quantized neural network 102. An example operation of the preprocessing network 100 and quantized neural network 102 running on the edge device may be summarized in the following TABLE 3:

TABLE 3

| X | 3.15 | 3.50 | 3.80 |
|---|------|------|------|
| H | 0.75 | 0.75 | 1 |
| X' | 2.36 | 2.63 | 3.80 |
| Xq | 3 | 3 | 4 |
| Yq | 21 | 21 | 35 |
| Q Err | 1.85 | 6.5 | 3.12 |

As may be seen by comparing TABLE 2 and TABLE 3, the quantization error Q Err may be lowered by passing the input through the preprocessing network 100 prior to application to the quantized neural network 102. The above example is a simple illustration of applying a pre-processing function H to lower the quantization error. In the above example, during a training process the preprocessing network 100 "learned" that the quantization scheme was applying a ceiling function, and thus modified the input X accordingly.

Figure 5:
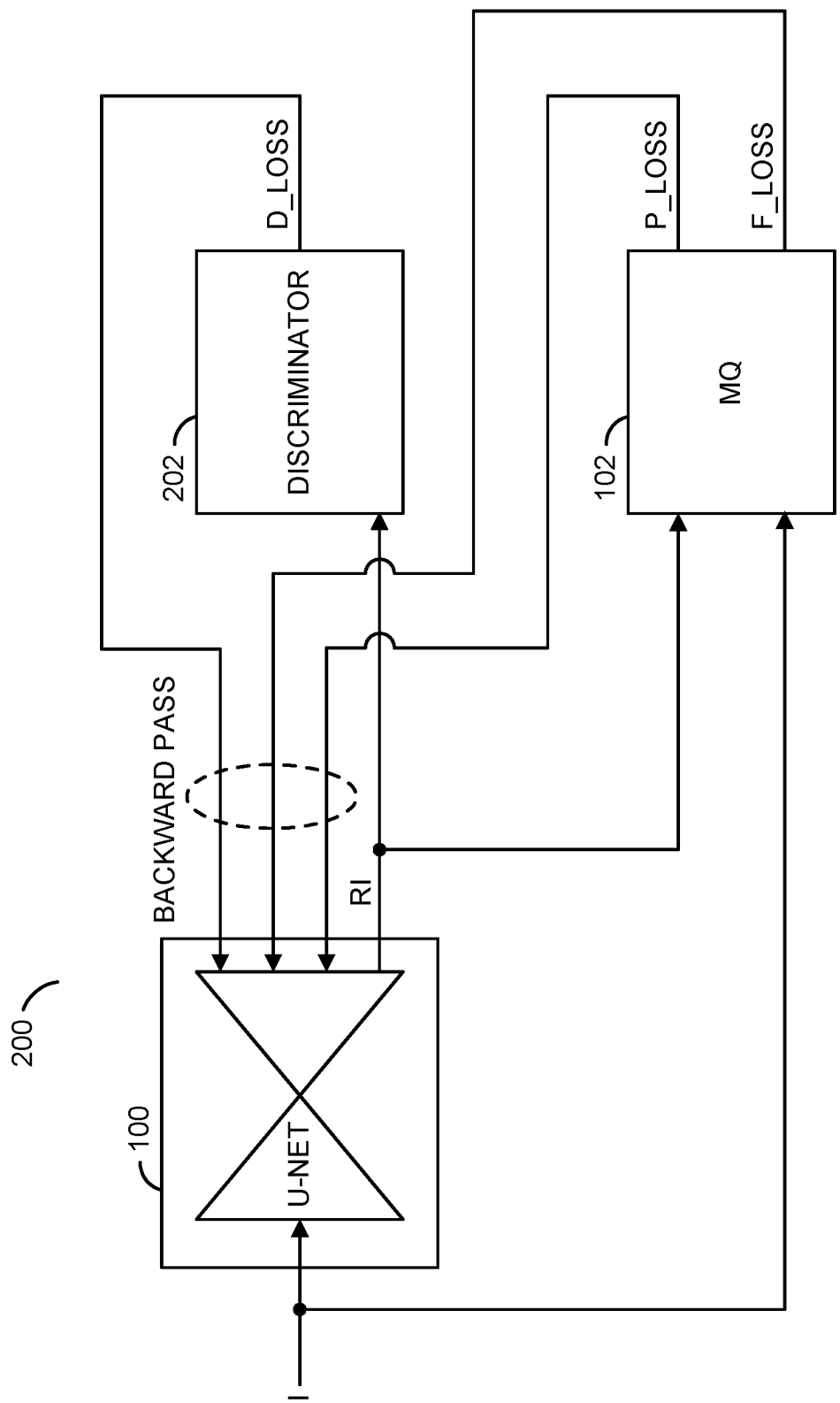
FIG. 5 is a diagram illustrating an example architecture for training a preprocessing network in accordance with example embodiments of the invention.

Referring to FIG. 5, a diagram is shown illustrating an example architecture for training a preprocessing network in accordance with example embodiments of the invention. In an example, a training architecture in accordance with example embodiments of the invention may comprise the preprocessing network 100, the quantized neural network 102 and a discriminator 202. An input signal may communicate an input image (e.g., I) that may be presented to an input of the preprocessing network 100 and a first input of the quantized neural network 102. An output of the preprocessing network 100 may comprise a representative image (e.g., RI) that may be presented to a second input of the quantized neural network 102 and an input of the discriminator 202. In an example, the preprocessing network 100 may be implemented as a generator (e.g., U-Net, etc.) that is initialized to random normal weights at the beginning of training. In an example, the preprocessing network 100 processes an input image I in the data set and, after encoding and decoding, comes up with an representative image (RI) of similar size. The representative image RI is then passed to both the discriminator 202 and the quantized neural network (MQ) 102.

The preprocessing network 100 may be trained to minimize one or more of the following losses: a) discriminator loss (D_LOSS), b) prediction loss (P_LOSS), and c) feature loss (F_LOSS). During the training process, the discriminator 202 generally tries to force the preprocessing network 100 to come up with representative images RI of similar distribution to the input images I. For each image RI, the loss between ground truth and predictions made by the MQ 102 may be propagated back and the gradient at the input of the MQ 102 may be passed to the preprocessing network 100. This ensures that the preprocessing network 100 learns better representations of the input images I. The input images I and the representative images RI are generally passed through the MQ 102. The pixel-wise loss between feature maps (e.g., feature loss F_LOSS) in the first few layers of the MQ 102 may also be passed to the preprocessing network 100.

In an example, the three losses may be weighted differently. Initially, the discriminator loss D_LOSS may be useful for maintaining the input distribution. The feature loss F_LOSS may ensure that the feature maps of representative images RI and the input images I are close (similar). These losses are useful in maintaining a close correspondence to the original distribution. Finally, the prediction loss P_LOSS contributes towards minimizing prediction loss due to quantization in the MQ 102. When trained in this manner, the preprocessing network 100 models the quantization loss in the MQ 102.

In an example, the preprocessing network 100 may be configured to produce images from images. Since the preprocessing network 100 is to be utilized to produce images from images, generative adversarial networks (GANs) may be reasonable to use as a training architecture. GANs are architectures comprised of two networks, pitting one against the other (thus the "adversarial" characterization). GANs can learn to mimic any distribution of data. In an example, GANs may be taught to create worlds similar to another in any domain: images, music, speech, prose.

In various embodiments, the preprocessing network 100 may be configured (trained) to model quantization loss and not necessarily produce similar looking images. The quantized neural network 102 is generally generated from a fully populated pre-trained neural network. In general, the preprocessing network 100 may be trained to improve the efficiency of the quantized neural network 102 without modifying/training the quantized neural network 102.

The preprocessing network 100 is generally trained offline. The compensation provided by the preprocessing network 100 generally enables the output of the quantized neural network 102 to be more accurate. In an example, the preprocessing network 100 may be implemented in a directed acyclic graph (DAG). In various on-chip embodiments, the data is applied sequentially—from capture through to the quantized neural network 102. The quantized neural network 102 is generally generated from a fully populated pre-trained neural network. In an example, the weights (e.g., WGTS 104) for the preprocessing network 100 and the quantized neural network 102 may be burned (programmed) into the silicon of an on-chip implementation. In an example, the input (e.g., images, audio, etc.) may be a data array. The discriminator 202 may be implemented as a network that is used in a GAN.

In various embodiments, the preprocessing network concept may be utilized for any network model. In an example, u-net may be utilized as the preprocessing network 100. However, the techniques described herein may be used to train whatever preprocessing network may be chosen. In an example, the particular structure of the preprocessing network chosen may be dependent of the particular edge device architecture and/or quantized network structure. In another example, the particular structure of the preprocessing network chosen may be independent of the particular edge device architecture and/or quantized network structure (e.g., no need of different preprocessing network for each neural network).

Figure 6:
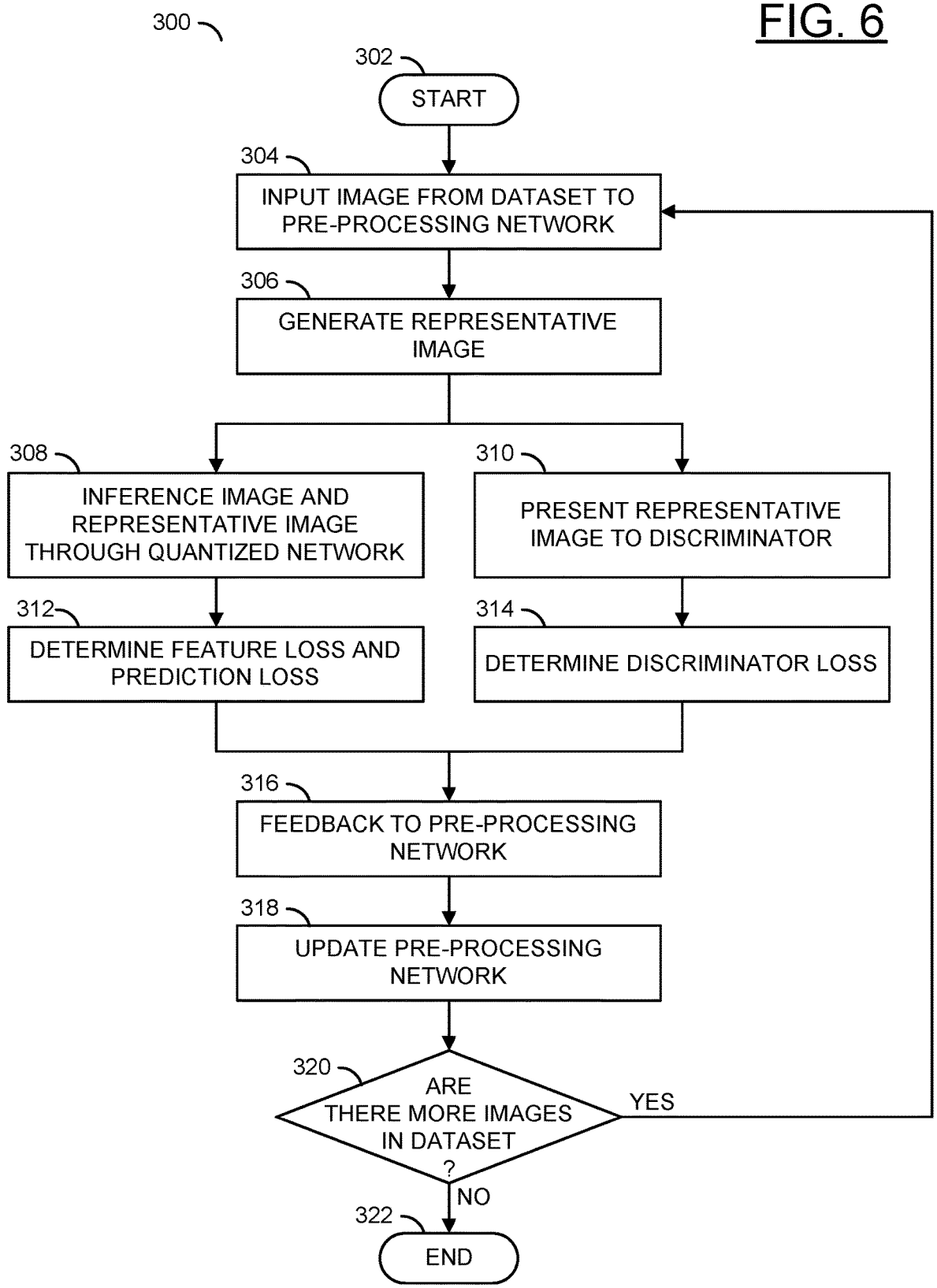
FIG. 6 is a diagram illustrating a process in accordance with example embodiments of the invention.

Referring to FIG. 6, a diagram is shown illustrating a process in accordance with example embodiments of the invention. In an example, a process (or method) 300 may be implemented to train the preprocessing network 100. In an example, the process 300 may comprise a step (or state) 302, a step (or state) 304, a step (or state) 306, a step (or state) 308, a step (or state) 310, a step (or state) 312, a step (or state) 314, a step (or state) 316, a step (or state) 318, a decision step (or state) 320, and a step (or state) 322. The process 300 may begin in the step 302, and move to the step 304. In the step 304, image data of an inference image (I) from a dataset of a user is input to the preprocessing network 100. In the step 306, the preprocessing network 100 generates a representative image (RI) in response to the image data of inference image (I).

In the step 308, the inference image (I) and the representative image (RI) are presented to the quantized neural network 102. In the step 310, the representative image (RI) is presented to the discriminator 202. The steps 308 and 310 may be performed concurrently.

In the step 312, feature loss and prediction loss of the quantized neural network 102 may be determined. In the step 314, discriminator loss of the discriminator 202 may be determined. The steps 312 and 314 may be performed concurrently.

In the step 316, one or more of the feature loss, the prediction loss, and the discriminator loss are fed back (back propagated) to the preprocessing network 100. Information from the quantized neural network 102 and the discriminator 202 is also passed backward to the preprocessing network 100. In an example, the gradient at the input of the quantized neural network 102 may be passed to the preprocessing network 100. In the step 318, the preprocessing network 100 is updated based upon the backward passed information and the one or more of the feature loss, the prediction loss, and the discriminator loss. In the decision step 320, the process 300 determines whether there are more inference images in the training dataset to be processed. When there are more images, the process 300 returns to the step 304. When no further images remain in the training dataset, the process 300 moves to the step 322 and terminates.

Figure 7:
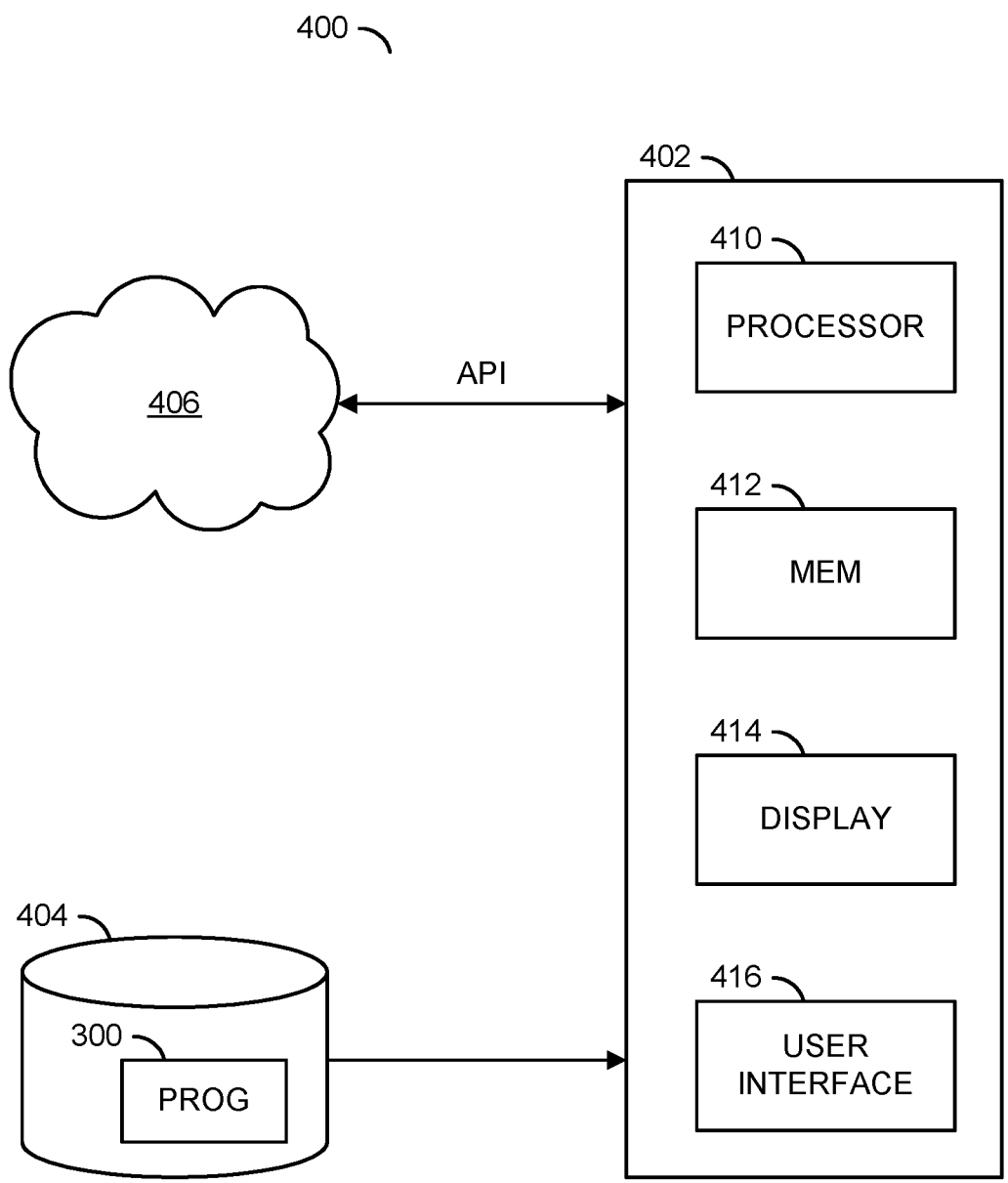
FIG. 7 is a diagram illustrating an example of a computer system in which the process of FIG. 6 may be implemented.

Referring to FIG. 7, a diagram is shown illustrating a context in which the process 300 of FIG. 6 may be implemented. In an example, a system 400 may be configured (e.g., through software) to perform the process 300 on a previously generated neural network. In an example, the system 400 may comprise a computer 402 and a computer readable storage medium 404. In an example, the computer 402 may be implemented as a general purpose computer system. In an example, the computer readable storage medium 404 may include, but is not limited to, a magnetic storage medium (e.g., a hard disk drive or HDD), an optical storage medium (e.g., compact disc (CD), digital video disc (DVD), BluRay disc (BD), a solid state drive (SSD), and/or a network associated storage system (NAS). In an example, the computer 402 and the computer readable storage medium 404 may be coupled together to exchange programs and data. In an example, a program (or programs) implementing the process 300 may be stored on the computer readable storage medium 404 or in cloud based resources 406. In an example, the computer 402 may be further configured to perform the process 300 utilizing the cloud resources 406. In an example, the computer 402 may be configured to perform the process 300 via an application program interface (API).

In an example, the computer 402 may include, but is not limited to, a processor 410, memory 412, a display 414, and a user interface 416. In various embodiments, the processor 410 may include, but is not limited to, a central processing unit (CPU), a graphics processing unit (GPU), and a video processing unit (VPU). In various embodiments, the memory 412 may include, but is not limited to, random access memory (e.g., SRAM, DRAM, FLASH, etc.), read only memory (ROM), and cache memory. The display 414 and the user interface 416 generally allow a user to initiate and monitor the computer 402 performing the process 300.

Figure 8:
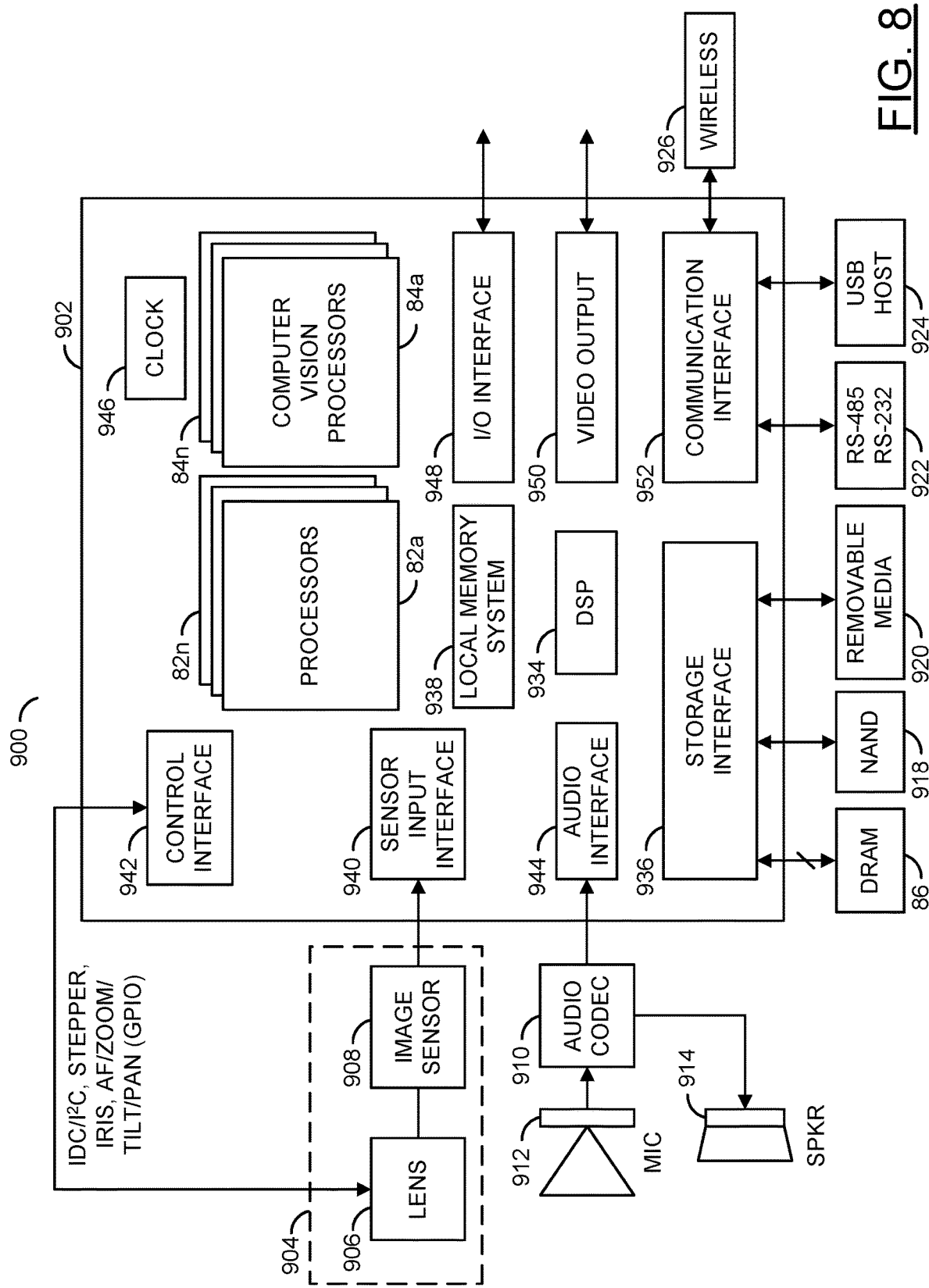
FIG. 8 is a diagram illustrating a context in which a preprocessing network generated in accordance with example embodiments of the invention may be utilized.

Referring to FIG. 8, a diagram illustrating a camera system 900 in accordance with an embodiment of the invention is shown. In one example, the electronics of the camera system 900 may be implemented as one or more integrated circuits. In an example, the camera system 900 may be built around a processor/camera chip (or circuit) 902. In an example, the processor/camera chip 902 may be implemented as an application specific integrated circuit (ASIC) or system on chip (SOC). The processor/camera circuit 902 generally incorporates hardware and/or software/firmware that may be configured to implement the processors, circuits, and processes described above in connection with FIG. 1 through FIG. 6.

In an example, the processor/camera circuit 902 may be connected to a lens and sensor assembly 904. In some embodiments, the lens and sensor assembly 904 may be a component of the processor/camera circuit 902 (e.g., a SoC component). In some embodiments, the lens and sensor assembly 904 may be a separate component from the processor/camera circuit 902 (e.g., the lens and sensor assembly may be an interchangeable component compatible with the processor/camera circuit 902). In some embodiments, the lens and sensor assembly 904 may be part of a separate camera connected to the processor/camera circuit 902 (e.g., via a video cable, a high definition media interface (HDMI) cable, a universal serial bus (USB) cable, an Ethernet cable, or wireless link).

The lens and sensor assembly 904 may comprise a block (or circuit) 906 and/or a block (or circuit) 908. The circuit 906 may be associated with a lens assembly. The circuit 908 may be an image sensor. The lens and sensor assembly 904 may comprise other components (not shown). The number, type and/or function of the components of the lens and sensor assembly 904 may be varied according to the design criteria of a particular implementation.

The lens assembly 906 may capture and/or focus light input received from the environment near a camera. The lens assembly 906 may capture and/or focus light for the image sensor 908. The lens assembly 906 may implement an optical lens. The lens assembly 906 may provide a zooming feature and/or a focusing feature. The lens assembly 906 may be implemented with additional circuitry (e.g., motors) to adjust a direction, zoom and/or aperture of the lens assembly 906. The lens assembly 906 may be directed, tilted, panned, zoomed and/or rotated to provide a targeted view of the environment near the camera.

The image sensor 908 may receive light from the lens assembly 906. The image sensor 908 may be configured to transform the received focused light into digital data (e.g., bitstreams). In some embodiments, the image sensor 908 may perform an analog to digital conversion. For example, the image sensor 908 may perform a photoelectric conversion of the focused light received from the lens assembly 906. The image sensor 908 may present converted image data as a color filter array (CFA) formatted bitstream. The processor/camera circuit 902 may transform the bitstream into video data, video files and/or video frames (e.g., human-legible content).

The processor/camera circuit 902 may also be connected to (i) an optional audio input/output circuit including an audio codec 910, a microphone 912, and a speaker 914, (ii) the external memory 86, which may include dynamic random access memory (DRAM), (iii) a non-volatile memory (e.g., NAND flash memory) 918, a removable media (e.g., SD, SDXC, etc.) 920, one or more serial (e.g., RS-485, RS-232, etc.) devices 922, one or more universal serial bus (USB) devices (e.g., a USB host) 924, and a wireless communication device 926.

In various embodiments, the processor/camera circuit 902 may comprise a number of instances of the processor 82 (e.g., the processors 82a-82n), a number of instances of the processor 84 (e.g., the processors 84a-84n), a block (or circuit) 934, a block (or circuit) 936, a block (or circuit) 938, a block (or circuit) 940, a block (or circuit) 942, a block (or circuit) 944, a block (or circuit) 946, a block (or circuit) 948, a block (or circuit) 950, and/or a block (or circuit) 952. In various embodiments, the circuits 82a-82n may include one or more embedded processors (e.g., ARM, etc.). In an example, one or more of the circuits 84a-84n may implement a preprocessing network and a quantized neural network in accordance with an example embodiment of the invention. The circuit 934 may be a digital signal processing (DSP) module. In some embodiments, the circuit 934 may implement separate image DSP and video DSP modules.

The circuit 936 may be a storage interface. The circuit 936 may interface the processor/camera circuit 902 with the DRAM 86, the non-volatile memory 918, and the removable media 920. One or more of the DRAM 86, the non-volatile memory 918 and/or the removable media 920 may store computer readable instructions. The computer readable instructions may be read and executed by the processors 82a-82n. In response to the computer readable instructions, the processors 82a-82n may be operational to operate as controllers for the processors 84a-84n. For example, the resources 92a-92n may be configured to efficiently perform various specific operations in hardware and the processors 82a-82n may be configured to make decisions about how to handle input/output to/from the various resources 92a-92n.

The circuit 938 may implement a local memory system. In some embodiments, the local memory system 938 may include, but is not limited to a cache (e.g., L2CACHE), a direct memory access (DMA) engine, graphic direct memory access (GDMA) engine, and fast random access memory. In an example, the DAG memory 98 may be implemented in the local memory system 938. The circuit 940 may implement a sensor input (or interface). The circuit 942 may implement one or more control interfaces including but not limited to an inter device communication (IDC) interface, an inter integrated circuit ($I^2C$) interface, a serial peripheral interface (SPI), and a pulse width modulation (PWM) interface. The circuit 944 may implement an audio interface (e.g., an $I^2S$ interface, etc.). The circuit 946 may implement a clock circuit including but not limited to a real time clock (RTC), a watchdog timer (WDT), and/or one or more programmable timers. The circuit 948 may implement an input/output (I/O) interface. The circuit 950 may be a video output module. The circuit 952 may be a communication module. The circuits 82a-82n, 100a-100n and 934 through 952 may be connected to each other using one or more buses, interfaces, traces, protocols, etc.

The circuit 918 may be implemented as a nonvolatile memory (e.g., NAND flash memory, NOR flash memory, etc.). The circuit 920 may comprise one or more removable media cards (e.g., secure digital media (SD), secure digital extended capacity media (SDXC), etc.). The circuit 922 may comprise one or more serial interfaces (e.g., RS-485, RS-232, etc.). The circuit 924 may be an interface for connecting to or acting as a universal serial bus (USB) host. The circuit 926 may be a wireless interface for communicating with a user device (e.g., a smart phone, a computer, a tablet computing device, cloud resources, etc.). In various embodiments, the circuits 904-926 may be implemented as components external to the processor/camera circuit 902. In some embodiments, the circuits 904-926 may be components on-board the processor/camera circuit 902.

The control interface 942 may be configured to generate signals (e.g., IDC/I2C, STEPPER, IRIS, AF/ZOOM/TILT/PAN, etc.) for controlling the lens and sensor assembly 904. The signal IRIS may be configured to adjust an iris for the lens assembly 906. The interface 942 may enable the processor/camera circuit 902 to control the lens and sensor assembly 904.

The storage interface 936 may be configured to manage one or more types of storage and/or data access. In one example, the storage interface 936 may implement a direct memory access (DMA) engine and/or a graphics direct memory access (GDMA). In another example, the storage interface 936 may implement a secure digital (SD) card interface (e.g., to connect to the removable media 920). In various embodiments, programming code (e.g., executable instructions for controlling various processors and encoders of the processor/camera circuit 902) may be stored in one or more of the memories (e.g., the DRAM 86, the NAND 918, etc.). When executed by one or more of the processors 82a-82n, the programming code generally causes one or more components in the processor/camera circuit 902 to configure video synchronization operations and start video frame processing operations. The resulting compressed video signal may be presented to the storage interface 936, the video output 950 and/or communication interface 952. The storage interface 936 may transfer program code and/or data between external media (e.g., the DRAM 86, the NAND 918, the removable media 920, etc.) and the local (internal) memory system 938.

The sensor input 940 may be configured to send/receive data to/from the image sensor 908. In one example, the sensor input 940 may comprise an image sensor input interface. The sensor input 940 may be configured to transmit captured images (e.g., picture element, pixel, data) from the image sensor 908 to the DSP module 934, one or more of the processors 82a-82n and/or one or more of the processors 84a-84n. The data received by the sensor input 940 may be used by the DSP 934 to determine a luminance (Y) and chrominance (U and V) values from the image sensor 908. The sensor input 940 may provide an interface to the lens and sensor assembly 904. The sensor input interface 940 may enable the processor/camera circuit 902 to capture image data from the lens and sensor assembly 904.

The audio interface 944 may be configured to send/receive audio data. In one example, the audio interface 944 may implement an audio inter-IC sound ($I^2S$) interface. The audio interface 944 may be configured to send/receive data in a format implemented by the audio codec 910.

The DSP module 934 may be configured to process digital signals. The DSP module 934 may comprise an image digital signal processor (IDSP), a video digital signal processor DSP (VDSP) and/or an audio digital signal processor (ADSP). The DSP module 934 may be configured to receive information (e.g., pixel data values captured by the image sensor 908) from the sensor input 940. The DSP module 934 may be configured to determine the pixel values (e.g., RGB, YUV, luminance, chrominance, etc.) from the information received from the sensor input 940. The DSP module 934 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 948 may be configured to send/receive data. The data sent/received by the I/O interface 948 may be miscellaneous information and/or control data. In one example, the I/O interface 948 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 950 may be configured to send video data. For example, the processor/camera circuit 902 may be connected to an external device (e.g., a TV, a monitor, a laptop computer, a tablet computing device, etc.). The video output module 950 may implement a high-definition multimedia interface (HDMI), a PAL/NTSC interface, an LCD/TV/Parallel interface and/or a DisplayPort interface.

The communication module 952 may be configured to send/receive data. The data sent/received by the communication module 952 may be formatted according to a particular protocol (e.g., Bluetooth®, ZigBee®, USB, Wi-Fi, UART, etc.). In one example, the communication module 952 may implement a secure digital input output (SDIO) interface. The communication module 952 may include support for wireless communication by one or more wireless and/or cellular protocols such as Bluetooth®, ZigBee®, Z-Wave, LoRa, Wi-Fi IEEE 802.11a/b/g/n/ac, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, 5G, SMS, LTE M, NB-IoT, etc. The communication devices 110 may also include support for communication using one or more of the universal serial bus protocols (e.g., USB 1.0, 2.0, 3.0, etc.). The processor/camera circuit 902 may also be configured to be powered via a USB connection. However, other communication and/or power interfaces may be implemented accordingly to meet the design criteria of a particular application.

The processor/camera circuit 902 may be configured (e.g., programmed) to control the one or more lens assemblies 906 and the one or more image sensors 908. The processor/camera circuit 902 may receive raw image data from the image sensor(s) 908. The processor/camera circuit 902 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 902 may receive encoded and/or uncoded (e.g., raw) audio data at the audio interface 944. The processor/camera circuit 902 may also receive encoded audio data from the communication interface 952 (e.g., USB and/or SDIO). The processor/camera circuit 902 may provide encoded video data to the wireless interface 926 (e.g., using a USB host interface). The wireless interface 926 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The processor/camera circuit 902 may also include support for communication using one or more of the universal serial bus protocols (e.g., USB 1.0, 2.0, 3.0, etc.).

The functions performed by the diagrams of FIGS. 1-8 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a preprocessing network configured to (a) receive an input and (b) generate an intermediate result in response to said input and first weight values; and
a quantized neural network configured to (a) receive said intermediate result, (b) perform a plurality of weighted operations on said intermediate result using second weight values, and (c) generate an output in response to said weighted operations, wherein (a) said quantized neural network is adapted to a hardware constraint of an edge device, (b) said weighted operations performed by said quantized neural network have a quantization loss corresponding to said hardware constraint, and (c) said first weight values enable said preprocessing network to model a quantization scheme for said quantized neural network, which enables said preprocessing network to compensate for said quantization loss of said quantized neural network.

2. The apparatus according to claim 1, wherein said apparatus is implemented as a component of said edge device.

3. The apparatus according to claim 1, wherein said quantized neural network is generated from a fully populated pre-trained neural network.

4. The apparatus according to claim 1, further comprising a memory storing directed acyclic graphs and predetermined weights implementing said preprocessing network and said quantized neural network.

5. The apparatus according to claim 1, wherein said first weight values for said preprocessing network and said second weight values for said quantized neural network are determined based upon a shared data set.

6. The apparatus according to claim 1, further comprising a sensor configured to generate said input.

7. The apparatus according to claim 6, wherein said sensor comprises an image sensor.

8. The apparatus according to claim 7, wherein said image sensor is connected to a camera system on chip integrated circuit and camera system on chip integrated circuit is configured to apply said preprocessing network and said quantized neural network on image data received from said image sensor.

9. A method for adapting a quantization loss comprising the steps of:

receiving an input using an edge device;

presenting said input to a preprocessing network configured to generate an intermediate result in response to said input and first weight values; and presenting said intermediate result to a quantized neural network, wherein (a) said quantized neural network generates an output in response to said intermediate result by performing a plurality of weighted operations on said intermediate result using second weight values, (b) said weighted operations performed by said quantized neural network have a quantization loss corresponding to a hardware constraint of said edge device, (c) said first weight values enable said preprocessing network to model a quantization scheme for said quantized neural network, which enables said preprocessing network to compensate for said quantization loss of said quantized neural network.

10. The method according to claim 9, wherein (i) said quantized neural network is adapted to a hardware constraint of said edge device and (ii) said quantization loss of said quantized neural network corresponds to said hardware constraint.

11. A method of adapting for a quantization loss, comprising the steps of:

processing an input image using a preprocessing network;

generating a representative image in response to (a) said input image and (b) weight values;

generating a discriminator loss value using a discriminator in response to said representative image received from said preprocessing network;

generating a prediction loss value using a quantized neural network in response to said representative image;

generating a feature loss value by processing said input image and said representative image using said quantized neural network;

presenting said discriminator loss value, said prediction loss value and said feature loss value as feedback to said preprocessing network; and updating said weight values for said preprocessing network in response to said feedback, wherein (i) updating said weight values enables said preprocessing network to model a quantization scheme for said quantized neural network and (ii) modeling said quantization scheme enables said preprocessing network to compensate for quantization losses of said quantized neural network.

12. The method according to claim 11, wherein said representative image is similar in size to said input image.

13. The method according to claim 11, wherein said weight values are initialized to random weights.

14. The method according to claim 11, wherein said input image is one of a plurality of images in a data set.

15. The method according to claim 11, wherein (i) said quantized neural network is generated from a fully populated pre-trained neural network to adapt to a hardware constraint of an edge device and (ii) said quantization losses of said quantized neural network are a result of adapting to said hardware constraint of said edge device.

16. The method according to claim 15, wherein said hardware constraint comprises a fixed point data format.

17. The method according to claim 16, wherein said fixed point data format is 8 bits.

18. The method according to claim 11, wherein said discriminator loss value is fed back to force said preprocessing network to generate representative images with a similar distribution to input images.

19. The method according to claim 11, wherein said feature loss value comprises a pixel-wise loss between (i) a first feature map in a pre-determined number of layers of said quantized neural network generated in response to said input image and (ii) a second feature map in said pre-determined number of layers of said quantized neural network generated in response to said representative image.

20. The method according to claim 11, wherein modeling said quantization scheme improves a network efficiency of said quantized neural network and avoids modifying or training said quantized neural network.

* * * * *